(12) United States Patent
Sung et al.

(10) Patent No.: US 11,421,777 B2
(45) Date of Patent: Aug. 23, 2022

(54) GEAR SYSTEM

(71) Applicant: LG Magna e-Powertrain Co., Ltd., Incheon (KR)

(72) Inventors: Changwoo Sung, Seoul (KR); Deokkyu Lee, Seoul (KR); Junggu Lee, Seoul (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 0 days.

(21) Appl. No.: 16/901,661

(22) Filed: Jun. 15, 2020

(65) Prior Publication Data

US 2021/0262563 A1 Aug. 26, 2021

(30) Foreign Application Priority Data

Feb. 24, 2020 (KR) ........................ 10-2020-0022367

(51) Int. Cl.
*F16H 57/04* (2010.01)
*F16H 1/32* (2006.01)

(52) U.S. Cl.
CPC ....... *F16H 57/0482* (2013.01); *F16H 57/043* (2013.01); *F16H 57/045* (2013.01); *F16H 57/0424* (2013.01); *F16H 57/0426* (2013.01); *F16H 57/0471* (2013.01); *F16H 57/0479* (2013.01); *F16H 2001/327* (2013.01)

(58) Field of Classification Search
CPC .. F16H 57/0482; F16H 57/043; F16H 57/045; F16H 57/0471; F16H 57/0479; F16H 57/04; F16H 57/042–0427; F16H 57/0453; F16H 57/0457; F16H 211/32; F16H 2001/327

See application file for complete search history.

(56) References Cited

U.S. PATENT DOCUMENTS 4,222,283 A   9/1980   Nagy
4,480,493 A   11/1984  Takahashi
(Continued)

FOREIGN PATENT DOCUMENTS

CN      105190106 A   *  12/2015   ......... F16H 57/0457
DE   102009055005 A1  *   9/2010   ........... F16H 57/043
(Continued)

OTHER PUBLICATIONS

FR3056666 translation (Year: 2018).*
(Continued)

*Primary Examiner* — Timothy Hannon
(74) *Attorney, Agent, or Firm* — Birch, Stewart, Kolasch & Birch, LLP (57) ABSTRACT

A gear system is disclosed. The gear system has a structure in which oil churned by a gear is dispensed to at least one of a hollow space or a bearing, thereby effectively lubricating components. For example, the gear system includes a first shaft comprising a hollow space, a first gear arranged at an outer circumference of the first shaft, a second gear externally engaged with the first gear, a bearing arranged at the outer circumference of the first shaft, a housing surrounding the first gear and the second gear, and an oil guide plate disposed between the first shaft and the housing to dispense oil churned by the second gear to the hollow space of the first shaft and the bearing coupled to the first shaft.

14 Claims, 9 Drawing Sheets

(56) References Cited

U.S. PATENT DOCUMENTS

| | | | |
|---|---|---|---|
| 7,377,870 B2 | 5/2008 | Matsushita et al. | |
| 8,602,935 B2 | 12/2013 | Katoh et al. | |
| 9,581,236 B2* | 2/2017 | Tage | F16H 57/0494 |
| 10,968,986 B1* | 4/2021 | Sung | F16D 23/00 |
| 2011/0319215 A1* | 12/2011 | Katoh | B60K 17/356 |
| | | | 475/149 |
| 2012/0286607 A1* | 11/2012 | Shimizu | F16H 57/0476 |
| | | | 310/90 |
| 2013/0008274 A1* | 1/2013 | Mori | H02K 7/083 |
| | | | 74/421 A |
| 2013/0283955 A1 | 10/2013 | Araki et al. | |
| 2013/0283972 A1* | 10/2013 | Yamamoto | F16H 57/0486 |
| | | | 74/665 B |
| 2016/0061305 A1* | 3/2016 | Kim | B60K 6/383 |
| | | | 475/5 |
| 2019/0093754 A1* | 3/2019 | Heki | F16H 57/0424 |
| 2019/0181720 A1* | 6/2019 | Yamaguchi | F16H 57/0421 |
| 2019/0329642 A1* | 10/2019 | Hori | F16H 57/037 |

FOREIGN PATENT DOCUMENTS

| | | |
|---|---|---|
| DE | 10 2018 123540 A1 | 3/2019 |
| EP | 0984207 A2 | 9/1999 |
| FR | H04-277360 | 2/1992 |
| FR | 3056666 A1 | 3/2018 |
| JP | 2017166626 A * | 9/2017 |
| KR | 10-1575272 B1 | 12/2015 |
| WO | WO 2012/153589 A1 | 11/2012 |
| WO | WO 2014/108250 | 7/2014 |

OTHER PUBLICATIONS

Communication and Search Report from the European Patent Office issued in Application No. 20182802.7-1012 dated Nov. 18, 2020 (11 pages).

* cited by examiner

GEAR SYSTEM

CROSS-REFERENCE TO RELATED APPLICATION

This application claims the benefit of Korean Patent Application No. 10-2020-0022367, filed on Feb. 24, 2020, in the Korean Intellectual Property Office, the disclosure of which is incorporated herein in its entirety by reference.

BACKGROUND

1. Field

The present disclosure relates to a gear system and one particular embodiment relates to a gear system having a lubrication structure.

2. Description of the Related Art

In general, a vehicle is capable of controlling a rotational speed or a rotational force of a wheel using a gear system such as a transmission or a speed reducer. An automobile needs to supply lubricating oil to components (e.g., gears, bearings, etc.) of a gear system to minimize wear, noise, or heat generation of the components. In this regard, in, order to lubricate such components, it has been common in related technologies to install a separate oil pump and drive the oil pump to supply oil to a place where lubrication is needed by using the power of the oil pump.

In recent years, there are increasing demands for electric vehicles which use electric power or both electric power and petroleum as a power source to instead of internal combustion vehicles which use petroleum that causes pollution.

Such an electric vehicle may drive wheels by rotating a motor using electric power charged in a battery. However, the maxim charging capacity and energy efficiency of the better are considerably limited, so it is necessary to maximize the maximum distance for the electric vehicle to run, by reducing the weight of the electric vehicle.

For example, since an electric vehicle drives wheels by a motor, an excessively large-sized transmission used in an existing internal combustion vehicle driving wheels by an engine may be unnecessary, and instead a speed reducer may be installed to reduce a rotational speed of the motor and increase a torque thereof.

Methods for dispensing oil to the components without an existing oil pump are required for the above-described electric vehicle or internal combustion vehicle to lubricate the components included in a gear system.

As an example a method of lubricating components by churning oil accumulated at the bottom of a gearbox (a housing) by gear teeth of an adjacent gear when the adjacent gear is rotated is considered.

SUMMARY

However, when an oil churning lubrication structure is applied, a force to push the oil is not strong compared to a method using an oil pump, and hence, the oil may not properly reach each component required to be lubricated and lubrication may not be performed effectively. In addition, a lot of oil is delivered to a component located close to a gear, and the oil is not delivered properly to a configuration located far from the gear or at an angle that makes it difficult to deliver churned oil to the corresponding component, As such, oil cannot be dispensed properly.

Aspects of the present disclosure are to address at least the above-mentioned problems and to provide a gear system that enables smooth lubrication by adopting a simple structure without using an oil pump, thereby reducing unnecessary waste of energy.

According to an, aspect of the present disclosure, there is provided a gear system having a structure in which oil churned by a gear is properly dispensed to at least one of a hollow space or a bearing, thereby effectively lubricating components. For example, the gear system may include a first shaft, and an oil guide plate interposed between the first shaft and a housing surrounding the first shaft and dispensing oil churned by a gear to a hollow space of the first shaft and a bearing coupled to the first shaft.

According to another aspect of the present disclosure, there is provided a gear system including a first shaft comprising a hollow space, a first gear arranged at an outer circumference of the first shaft, a second gear externally engaged with the first gear, a bearing arranged at the outer circumference of the first shaft to support a load of the housing surrounding the first gear and the second gear, and an oil guide plate interposed between the first shaft and the housing and dispensing oil, churned by rotation of the second gear, to the hollow space of the first shaft and the bearing.

According to yet another aspect of the present disclosure, there is provided a gear system including a first shaft comprising a hollow space, a first gear arranged at an outer circumference of the first shaft, a second gear externally engaged with the first gear, a housing surrounding the first gear and the second gear, and an oil guide plate comprising an opening connected to the hollow space. The housing may include a reservoir accumulating the oil churned by the rotation of the second gear, and an oil flow path transferring the oil from the reservoir to the oil guide plate.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas, disclosed in the present specification. Therefore, it should be understood that the accompanying drawings include all modifications, equivalents and substitutions included in the scope and sprit, of the present disclosure.

It will be understood that although the terms first second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or it intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", "includes" etc. specify the presence of stated features, integers, steps, operations, element, componets, or combinations thereof, but do no preclude the presence or addition of one or more other features, integers, steps, operations, elements, components, or combinations thereof.

Figure 1:
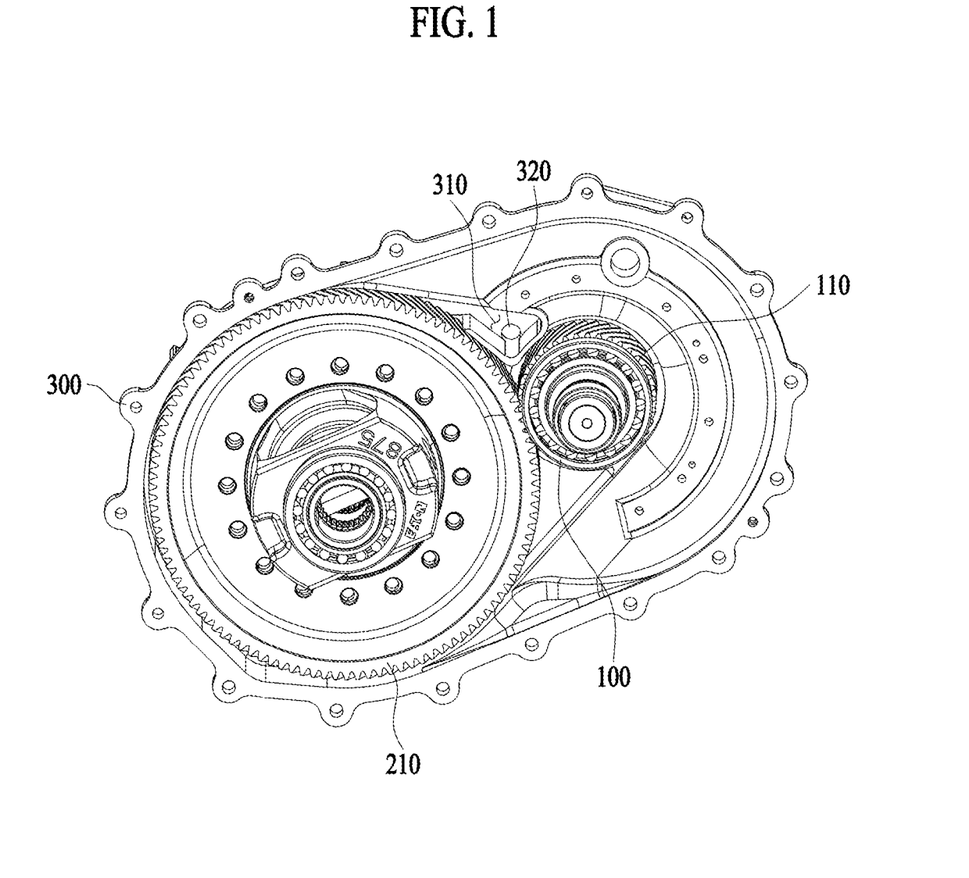
FIG. 1 is a view for explaining a configuration of a gear system according to an embodiment of the present disclosure.
Figure 2:
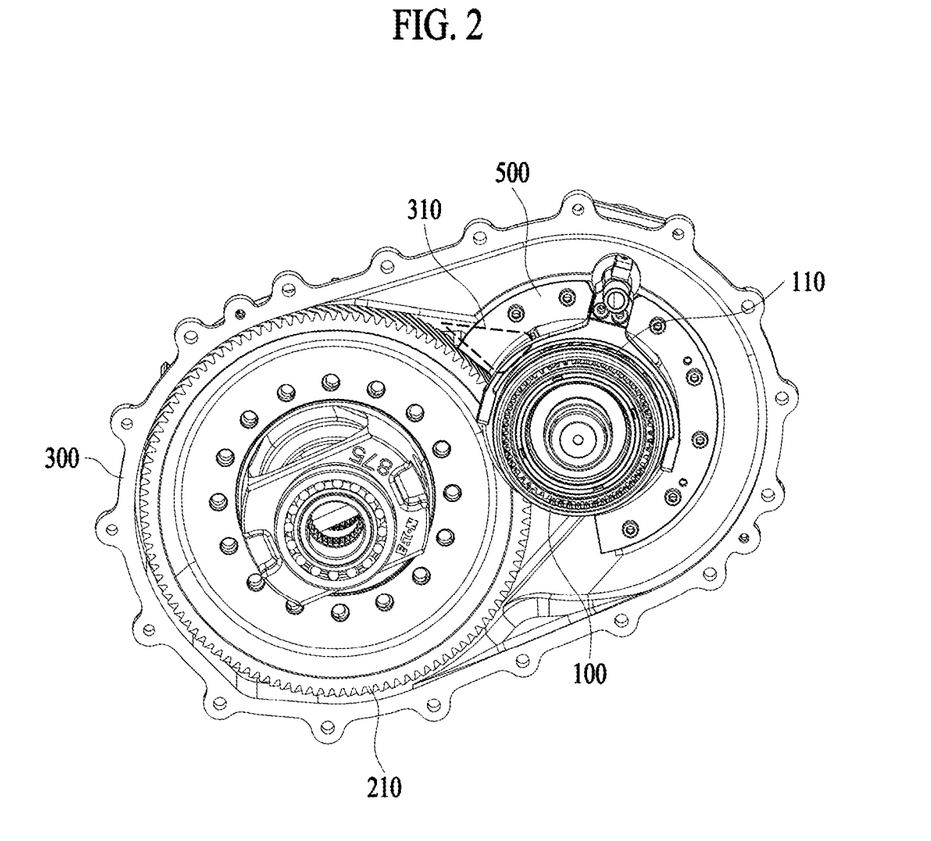
FIG. 2 is a view for explaining a configuration of a gear system according to an embodiment of the present disclosure.

FIGS. 1 and 2 are views for explaining a configuration of a gear system according to an embodiment of the present disclosure. For example, FIG. 2 is a perspective view illustrating a disc 500 mounted in the gear system of FIG. 1.

The gear system according to various embodiments may include a first shaft 100, the first gear 110 arranged at an outer circumference of the first shaft 100, and a second gear 210 arranged to be externally engaged with the first gear 110. As the second gear 210 is engaged with the first gear 110, the second gear 210 may be rotated in a direction opposite to a rotating direction of the first gear 110 when the first gear 110 is rotated. For example, the second gear 210 may have more gear teeth than the first gear 110, as shown in FIGS. 1 and 2.

The first gear 110 and the second gear 210 may be arranged imide a housing 300. For example, the housing 300 may be configured to enclose various components of the gear system including the first gear 110 and the second gear 210.

Referring to FIG. 1, the housing 300 according to various embodiments may include a reservoir 310 located above a portion where the first gear 110 and the second gear 210 are externally in contact with each other.

For example, the reservoir 310 may have a shape which is open in a circumferential direction of the second gear 210 to receive the oil, which is churned by the rotation of the second gear 210, and which is blocked from the side of the first gear 110 to prevent the received oil from leaking toward the first gear 110.

Referring to FIG. 2, the reservoir 310 according to an embodiment may be covered by a disc 500. The disc 500 may form one surface of the reservoir 310, which is a space where oil is received.

According to various embodiment the housing 300 may further include an oil flow path 320. For example, the oil accumulated in the reservoir 310 may flow along the oil flow path 320 toward an oil guide plate 400 (see FIG. 3C). The oil may be moved to the outside of the housing 300 (for example, in +z direction) by the oil flow path 320 provided in the housing 300, and be then distributed to at least one of a hollow space of the first shaft 100 or a bearing.

For example the oil flow path 320 ay include a first flow path extending in parallel with an axial direction of the first gear 110 at one side of the reservoir 310, and a second flow path extending in a circumferential direction of the second gear 210 at one side of the first flow path. The oil guide plate 400 may include an inlet 430 connected to the second flow path so that oil transferred through the second flow path may be introduced. The inlet 430 of the oil guide plate 400 may be formed to correspond to a direction of the second flow path.

Figure 3A:
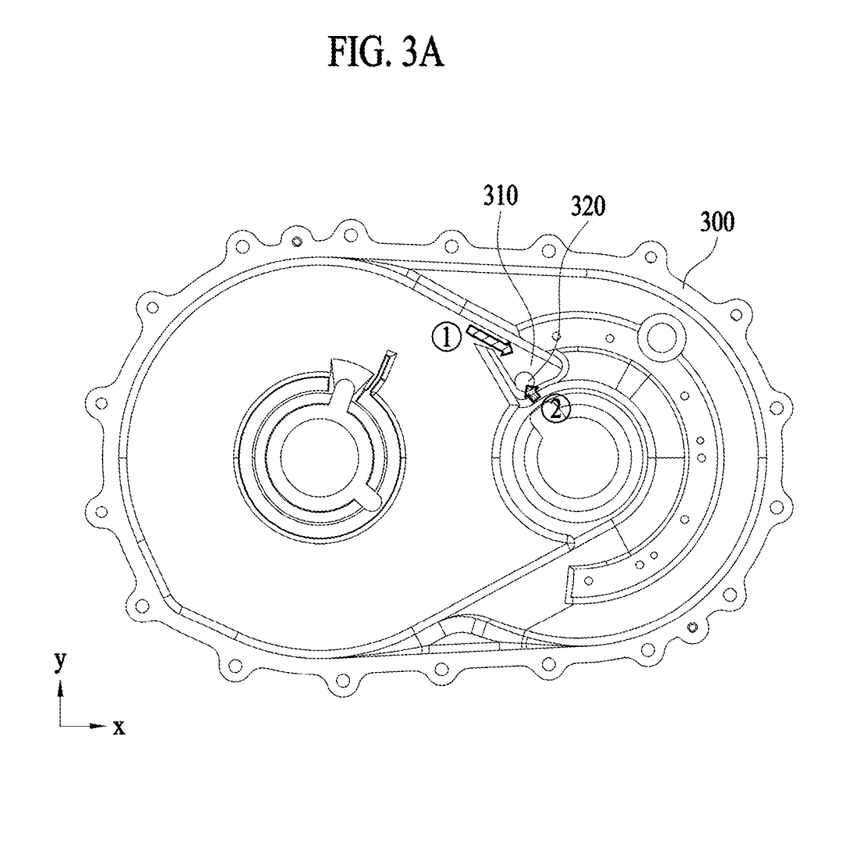
FIGS. 3A to 3C are views for explaining a shape of an oil flow path and a moving direction of oil according to an embodiment of the present disclosure.
Figure 3B:
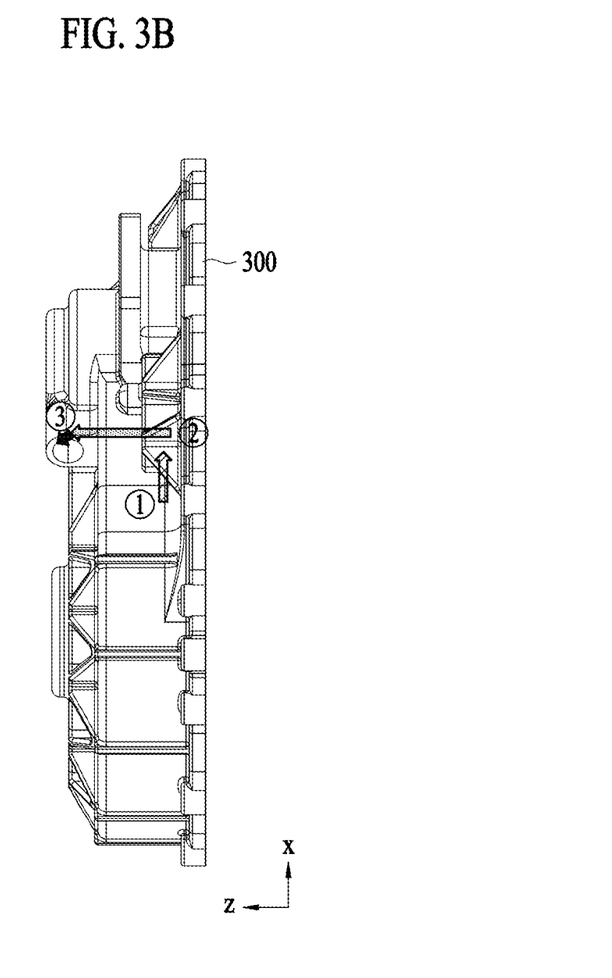
Figure 3C:
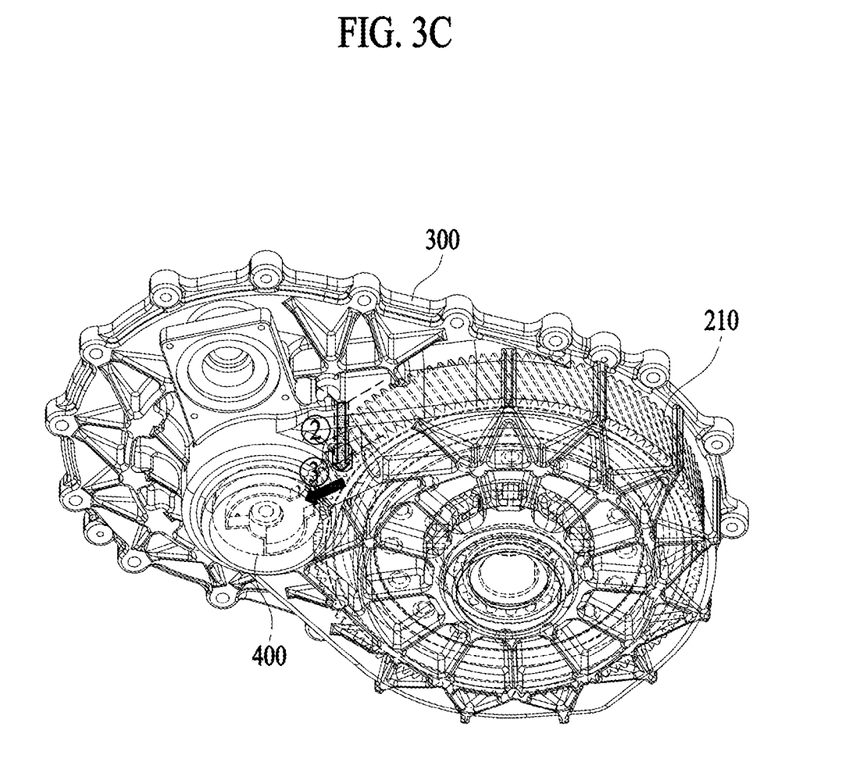

FIGS. 3A to 3C are views for explaining a shape of the oil flow path 320 and a moving direction of oil according to an exemplary embodiment. For example, FIG. 3A is a front view of the housing 300 according to one embodiment of the present disclosure, FIG. 3B is a top view of the housing 300, and FIG. 3C is a rear view of the housing 300.

According to various embodiments of the present disclosure, the oil churned by rotation of the second gear 210 may move into the reservoir 310 via a course ① along the circumferential direction of the second gear 210.

In addition, the oil introduced into the reservoir 310 may move into a course ② (e.g., +z direction) through an oil flow path 320 (e.g., the first flow path) provided at one side of the reservoir 310 along the axial direction of the first shaft 100.

In addition, the oil having moved into the course ② may move into a course ③ along the circumferential direction of the second gear 210 through the oil flow path (e.g., the second flow path) and may flow to the side of the oil guide plate 400 connected to the oil flow path 320 (e.g., the second flow path).

In addition to the shapes of the first flow path and the second flow path described above, various shapes such as a shape directed toward the hollow space of the first shaft 100 through the housing 300 may be applied to the oil flow path 320.

Figure 4A:
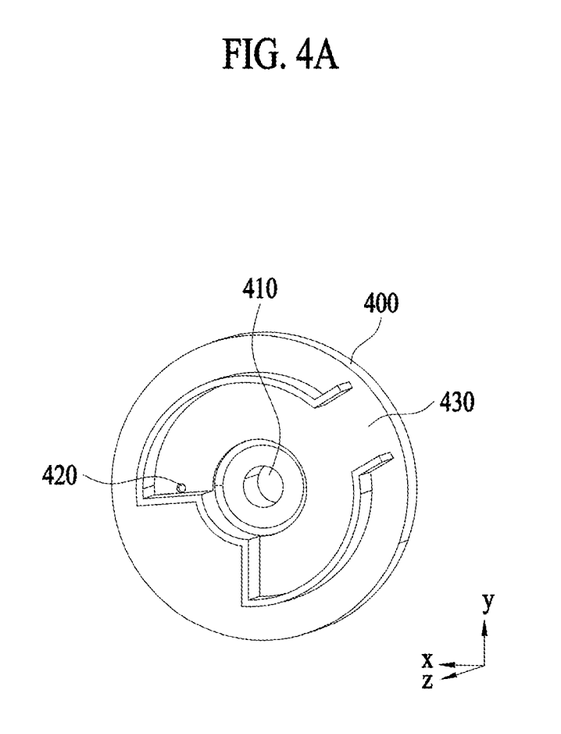
FIG. 4A is a perspective view illustrating an oil guide plate according to an embodiment of the present disclosure.
Figure 4B:
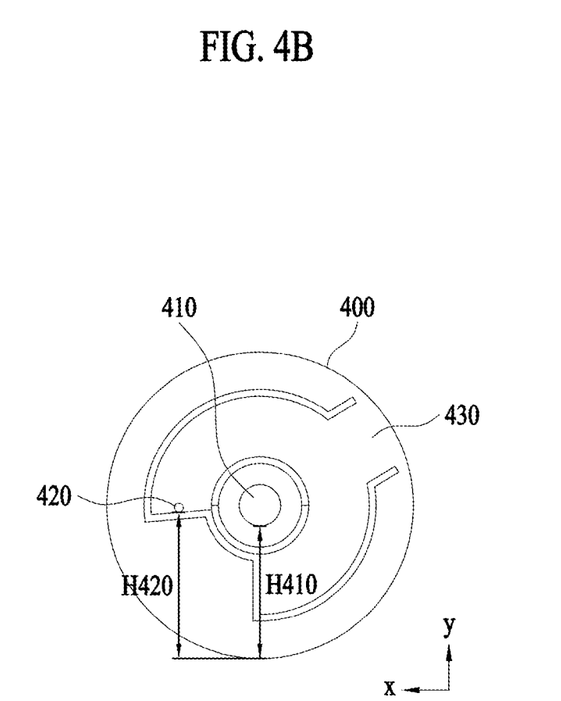
FIG. 4B is a front view of an oil guide plate according to one embodiment of the present disclosure.

FIGS. 4A and 4B are perspective and front vi ting the oil guide plate 400 according to an embodiment of the present disclosure.

The oil guide plate 400 may be configured to dispense oil from the reservoir 310 to at least one of a hollow space 105 (see FIG. 5) of the first shaft 100 or a component (e.g., a bearing 120 (see FIG. 5)) connected to the outer circumference of the first shaft 100. For example, the oil guide plate 400 may be interposed between the first shaft 100 and the housing 300 and may dispense the oil, flown from the oil flow path 320, inside and outside of the first shaft 100.

Referring to FIGS. 4A and 4B, the oil guide plate 400 according to various embodiments may include a first hole 410 and a second hole 420.

For example, the first hole 410 may be located to correspond to the hollow space 105 of the first shaft 100 and may be connected to the hollow space 105 of the 100.

For example, the second hole 420 may be connected to a component, arranged at the outer circumference of the first shaft 100, for example, the bearing 120.

The oil guide plate 400 may include an inlet 430 that is open toward the oil flow path 320 (e.g., the second flow path) of the housing 300. Oil from the oil passage 320 may flow into an inner space of the oil guide plate 400 through the inlet 430 to be dispensed to an outside of the oil guide plate 400 through the first hole 410 or the second hole 420. The inner space of the oil guide plate 400 may refer to a region where oil is confined between the oil guide plate 400 and the housing 300.

Meanwhile, referring to FIG. 4B, in the oil guide plate 400 according to various embodiments, the size of the first hole 410 and the size of the second hole 420 may be different each other. For example, the area of the second hole 420 may be smaller than the area of the first hole 410. According to an embodiment, based on the size (or area) of the first hole 410 and the second hole 420, the amount of oil dispensed from the oil guide plate 400 may be determined. For example, a relatively larger proportion of oil introduced into the inner space of the oil guide plate 400 may be dispensed to the hollow space 105 through the first hole 410, and a relatively smaller proportion of oil may be dispensed to the side of the bearing 120 through the second hole 420.

In addition, a height H410 of lowest portion of the first hole 410 may be lower than a height H420 of a lowest portion of the second hole 420. For example, the oil introduced into the oil guide plate 400 may be gradually accumulated in the inner space of the oil guide plate 400, and, after the level of the oil becomes higher than the height H410 of the lowest portion of the first hole 410, the oil may first flow to the outside (e.g., the hollow space 105) through the first hole 410. In addition, when the water level of the oil is accumulated until becoming higher than the height H420 of the lowest portion of the second hole 420, the oil may additionally flow to the outside (e.g., the bearing 120) through the second hole (420).

According to various embodiments of the present disclosure, the structure of oil guide plate 400 and the housing 300 may dispense the oil churned by the second gear 210 to the hollow space 105 of the first shaft 100 and the bearing 120 in an appropriate amount.

Figure 5:
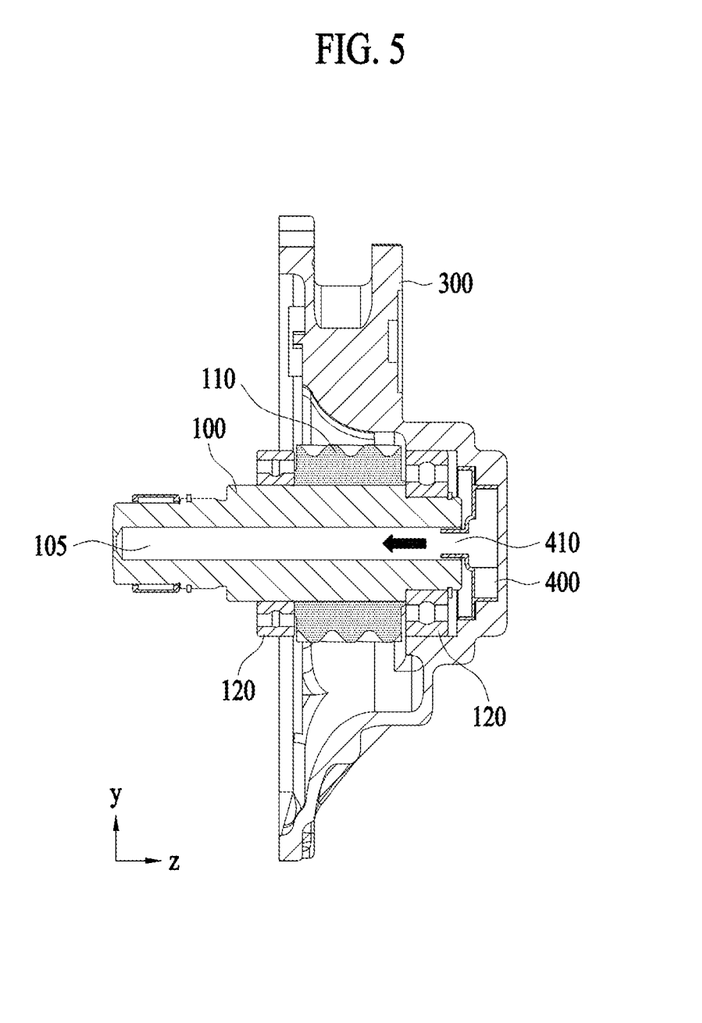
FIG. 5 is a cutaway cross-sectional view schematically illustrating a gear system according to an embodiment of the present disclosure.

FIG. 5 is a cutaway cross-sectional view schematically illustrating a gear system according to an embodiment of the present disclosure. More specifically, FIG. 5 may correspond to a longitudinal cross-sectional view of the center of the fiat shaft 100.

As described above, the gear system according to various embodiments includes a first shaft 100 including the hollow space 105, and the first gear 110 coupled to the outer circumference of the first shaft 100. The first gear 110 may be arranged to engage with the second gear 210 (see FIG. 1), thereby transferring a rotational force of the first gear 110 to the side of the second gear 210.

A component such as the bearing 120 supporting the load of the first shaft 100 may be further arranged at the outer circumference of the first shaft 100. The bearing 120 may be located at an end portion of the first shaft 100 between the first gear 110 and the oil guide plate 400. For example, the bearing 120 may be arranged at both sides of the first gear 110 with the first gear 110 interposed therebetween as shown in FIG. 5.

Referring to FIG. 5, the oil, which is churned by the second gear 210 and introduced into the oil guide plate 400 through the reservoir 310 of the housing 300 and the oil flow path 320, may flow into the hollow space 105 through the first hole 410 connected to the hollow space 105. The first hole 410 of the oil guide plate 400 has a shape that partially protrudes in a direction toward the hollow space 105 and may be inserted into the hollow space 105.

Although not shown in FIG. 5, after a predetermined amount of oil moves through the first hole 410, the oil may partially flow to the bearing 120 through the second hole 420, as described above.

Figure 6:
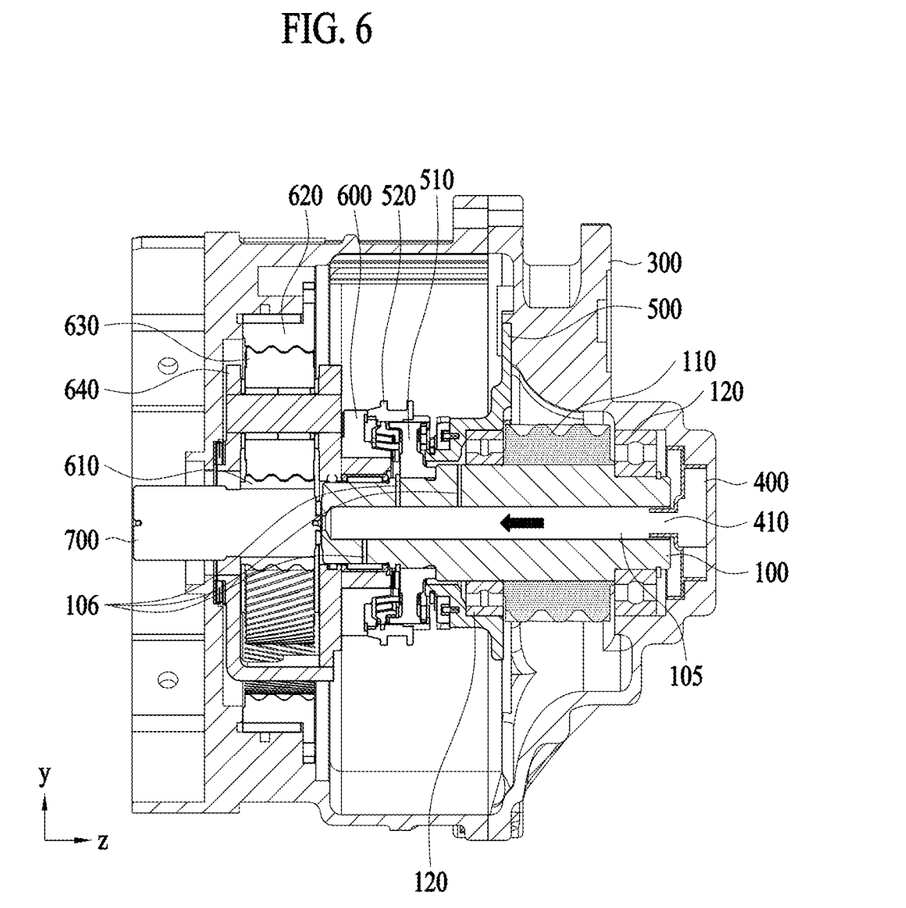
FIG. 6 is a cutaway cross-sectional view schematically showing a gear system according to an embodiment of the present disclosure.

FIG. 6 is a cutaway cross-sectional view schematically showing a gear system according to an embodiment of the present disclosure.

Referring to FIG. 6, the gear system may further include a hub 510 coupled to the outer circumference of the first shaft 100, a sleeve 520 coupled to the outer circumference of the hub 510, and a disc 500 fixed to one side of the housing 300. In one embodiment, the sleeve 520 may be coupled to the outer periphery of the hub 510 using a spline, and the hub 510 may be coupled to the outer periphery of the first shaft 100 in a press-fit manner.

The sleeve 520 may be arranged to slidably move in the axial direction of the first shaft 100 on the outer circumference of the hub 510. The sleeve 528 may slidably move between a third shaft 600 and the disc 500 and may be engaged with either a clutch gear of the third shaft 600 or a clutch gear of the disc 500 to couple the first shaft 100 to either the third shaft 600 or the disc 500.

For example, when the sleeve 520 couples the first shaft 100 to the third shaft 600, the vehicle equipped with the gear system may operate in a driving mode. In this case, a rotational force of the third shaft 600 may be transferred to the first shaft 100 and thereby transferred to the second gear 210 side.

Meanwhile, when the sleeve 520 couples the first shaft 100 to the disc 500, the vehicle equipped with the gear system may operate in a parking mode. In this case, the first shaft 100 may be connected to the housing 300 and may operate regardless of the rotation of the third shaft 600.

In addition, when the sleeve 520 does shaft 100 with any of the third shaft 600 and the disc 500, the vehicle equipped with the gear system operates in a neutral mode.

According to one embodiment of the present disclosure, the first shaft 100 may further include a lubrication flow path 106 extending in a radial direction from the hollow space 105. Oil having flown through the lubrication flow path 106 along the hollow space 105 may be transferred to each component (e.g., the bearing 120, the hub 510, the sleeve 520, etc.) arranged at the outer circumference of the first shaft 100.

According to one embodiment, the gear system may further comprise a planetary gear set. For example, the planetary gear set may include a sun gear 610, a ring gear 620, a plurality of pinion gears 630, and a carrier 640.

The sun gear 610 may rotate depending on the rotation of an input shaft 700. For example, when the vehicle equipped with the gear system an electric vehicle, the input shaft 700 may correspond to a rotating shaft connected to a motor to rotate depending on the driving of the motor. The sun gear 610 may be connected to the rotation shaft of the motor to rotate depending on the rotational force of the motor.

The pinion, gears 630 may be interposed between the sun gear 610 and the ring gear 620 and may move in engagement with the sun gear 610 and the ring gear 620, respectively. The pinion gear 630 may be spaced apart from each other at predetermined intervals.

The ring gear 620 may be arranged outside of the sun gear 10 and the pinion gear 630. The ring gear 620 may be fixed to the housing 300.

The carrier 640 may connect the pinion gears 630 and be coupled to a rotating shaft of each of the pinion gears 630. The carrier 640 may rotate about the third axis 600. For example, the third shaft 600 may be integrally formed with the carrier 640 or may be provided in a separate configuration from the carrier 640 while capable of rotating integrally with the carrier 640.

In FIG. 6, oil introduced from the oil guide plate 400 may be transferred to each component of the planetary gear set through the hollow space 105 of the first shaft 100.

According to various embodiments of the present disclosure, the gear system may transfer power in an order of the input shaft 700, the planetary gear set, the first shaft 100, the first gear 110, and the second gear 210 to thereby drive a wheel. The gear system may include a space for receiving the oil churned by the second gear 210 (e.g., the reservoir 310 of the housing 300, the oil flow path 320, and the oil guide plate 400) and may efficiently dispense the oil to each component of the gear system using a rotational force of the second gear 210 to lubricate each component.

The gear system according to various embodiments may save energy and maximize space utilization in the gear system using a structure that enables effective oil dispense and lubrication without a separate oil pump configuration.

It will be appreciated by those skilled in the art that the present disclosure can be embodied in specific forms other than those set forth herein without departing from the spirit and essential characteristics of the present disclosure.

Therefore, the above embodiments should be construed in all aspects as illustrative and not restrictive. The scope of the present disclosure should be determined by the appended claims and their legal equivalents, and all changes coming within the meaning and equivalency range of the appended claims are intended to be embraced therein.

What is claimed is:

1. A gear system, comprising:
   a first shaft comprising a hollow space;
   a first gear disposed around an outer circumference of the first shaft;
   a second gear engaged with the first gear;
   at least one bearing disposed around the outer circumference of the first shaft to support a load of the first shaft;
   a housing surrounding the first gear and the second gear; and
   an oil guide plate disposed between the first shaft and the housing, the oil guide plate being configured to dispense oil churned by rotation of the second gear to the hollow space of the first shaft and the at least one bearing,
   wherein the oil guide plate comprises:
      a first hole connected to the hollow space of the first shaft; and
      a second hole connected to the at least one bearing,
   wherein a lowest portion of the second hole is located higher than a lowest portion of the first hole, and is located lower than a highest portion of the first hole
   wherein the housing comprises:
      a reservoir configured to accumulate the oil churned by the rotation of the second gear; and
      an oil flow path connecting the reservoir and the oil guide plate so that oil accumulated in the reservoir flows to the oil guide plate, and
   wherein the gear system further comprises a planetary gear set arranged at an end portion of the first shaft so that the oil transferred to the oil guide plate moves to the planetary gear set through the hollow space.

2. The gear system of claim 1, wherein the oil flow path comprises:
   a first flow path extending in a direction parallel with an axial direction of the first shaft at one side of the reservoir; and
   a second flow path extending toward the oil guide plate in a circumferential direction of the second gear at one side of the first flow path.

3. The gear system of claim 2, wherein the oil guide plate further comprises an inlet open toward the second flow path.

4. The gear system of claim 1, wherein the at least one bearing is a plurality of bearings disposed around the outer circumference of the first shaft, wherein the first gear is disposed between the plurality of the bearings.

5. The gear system of claim 1, wherein an area of the second hole is smaller than an area of the first hole.

6. The gear system of claim 1, wherein the planetary gear set comprises:
   a sun gear connected to a rotating shaft of a motor and being configured to be rotated by the motor;
   a ring gear arranged outside of the sun gear and fixed to the housing;
   a plurality of pinion gears arranged between the sun gear and the ring gear so that the plurality of pinion gears engage with the sun gear and the ring gear; and
   a carrier coupled to rotating shafts of the plurality of pinion gears, the carrier being configured to rotate about a third shaft spaced apart from the first shaft.

7. The gear system of claim 6, further comprising:
   a disc fixed to the housing;
   a hub press-fit to the outer circumference of the first shaft; and
   a sleeve spline-coupled to an outer circumference of the hub and arranged to slidably move in an axial direction of the first shaft between the third shaft and the disc.

8. The gear system of claim 7, wherein, by slidably moving, the sleeve allows the first shaft to be selectively engaged with the third shaft or the disc.

9. The gear system of claim 7, wherein the disc forms one surface of the reservoir.

10. The gear system of claim 1, wherein the reservoir is located above a portion where the first gear contacts the second gear.

11. The gear system of claim 1, wherein a number of gear teeth of the second gear is greater than a number of gear teeth of the first gear.

12. The gear system of claim 1, wherein the oil guide plate is configured to transfer the oil received from the oil flow path through the first hole to the hollow space.

13. The gear system of claim 1, wherein:
   the first shaft further comprises a lubrication flow path formed in a radial direction at one side of the hollow space, and
   the oil transferred from the oil flow path moves outside of the first shaft through the hollow space.

14. The gear system of claim 1, wherein the reservoir is formed above a portion where the first gear contacts the second gear, and wherein the reservoir has a shape open in a circumferential direction of the second gear.

\* \* \* \* \*